United States Patent
Kamel et al.

(10) Patent No.: US 11,863,687 B2
(45) Date of Patent: *Jan. 2, 2024

(54) POST-COMPLETION ACTION MANAGEMENT IN ONLINE DOCUMENT SYSTEM

(71) Applicant: DocuSign, Inc., San Francisco, CA (US)

(72) Inventors: Ahmed Kamel, Seattle, WA (US); Naren Raghavan, Kirkland, WA (US); Ramachandra Tulasi, Mukilteo, WA (US)

(73) Assignee: DOCUSIGN, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,192

(22) Filed: Jul. 20, 2022

(65) Prior Publication Data

US 2022/0353091 A1 Nov. 3, 2022

Related U.S. Application Data

(63) Continuation of application No. 17/086,086, filed on Oct. 30, 2020, now Pat. No. 11,424,936.

(51) Int. Cl.
*H04L 9/32* (2006.01)
*G06F 21/62* (2013.01)
*G06F 21/64* (2013.01)

(52) U.S. Cl.
CPC ........ *H04L 9/3247* (2013.01); *G06F 21/6272* (2013.01); *G06F 21/645* (2013.01)

(58) Field of Classification Search
CPC .............. G06Q 10/103; G06Q 10/06; G06Q 10/0633; G06Q 10/06316; G06Q 10/1097; G06F 3/0482; G06F 8/34; G06F 21/6272; G06F 21/645; H04L 67/22; H04L 9/3247

USPC .............................. 705/7.27, 7.26, 301, 1.1
See application file for complete search history.

(56) References Cited

U.S. PATENT DOCUMENTS

| | | |
|---|---|---|
| 6,671,805 B1 | 12/2003 | Brown et al. |
| 6,796,489 B2 | 9/2004 | Slater et al. |
| 7,051,364 B1 | 5/2006 | Tackman et al. |
| 7,185,202 B2 | 2/2007 | Philips |

(Continued)

FOREIGN PATENT DOCUMENTS

| | | |
|---|---|---|
| WO | 2000057318 | 9/2000 |
| WO | 2000062220 | 10/2000 |
| WO | 2016099583 A1 | 6/2016 |

OTHER PUBLICATIONS

United States Office Action, U.S. Appl. No. 17/086,086, dated Dec. 23, 2021, 14 pages.

(Continued)

*Primary Examiner* — Brian F Shaw
(74) *Attorney, Agent, or Firm* — Shumaker & Sieffert, P.A.

(57) ABSTRACT

Technologies discussed include receiving a set of rules associated with a document type from a supplier entity. Each rule identifies a set of conditions and a set of actions to be taken after a document of a document type is signed if the set of conditions is satisfied. When a supplier entity sends a document of the document type to a signing entity and the signing entity provides an electronic signature, the system determines whether conditions of rules associated with the document type are satisfied. For each rule that is satisfied, the system performs actions identified by the rule.

20 Claims, 6 Drawing Sheets

(56) References Cited

U.S. PATENT DOCUMENTS

| | | | |
|---|---|---|---|
| 7,437,421 | B2 | 10/2008 | Bhogal et al. |
| 7,502,934 | B2 | 3/2009 | Dietl |
| 8,433,909 | B1 | 4/2013 | Sakkos et al. |
| 9,292,876 | B1 | 3/2016 | Shimkus |
| 9,355,083 | B1 | 5/2016 | Meran et al. |
| 9,779,063 | B1 | 10/2017 | Dykema |
| 9,953,019 | B2 | 4/2018 | Shimkus |
| 10,614,264 | B2 | 4/2020 | Shimkus |
| 10,878,183 | B2 | 12/2020 | Shimkus |
| 11,424,936 | B2 | 8/2022 | Kamel et al. |
| 2001/0018696 | A1 | 8/2001 | Hori et al. |
| 2002/0069179 | A1 | 6/2002 | Slater et al. |
| 2002/0120648 | A1 | 8/2002 | Ball et al. |
| 2003/0078880 | A1 | 4/2003 | Alley et al. |
| 2004/0093323 | A1 | 5/2004 | Bluhm et al. |
| 2005/0223325 | A1 | 10/2005 | Naitou |
| 2006/0074734 | A1 | 4/2006 | Shukla et al. |
| 2006/0085738 | A1 | 4/2006 | Chapus et al. |
| 2007/0043949 | A1 | 2/2007 | Bugbee |
| 2007/0201086 | A1 | 8/2007 | Kim et al. |
| 2008/0072334 | A1 | 3/2008 | Bailey et al. |
| 2008/0109717 | A1 | 5/2008 | Krauter |
| 2008/0235577 | A1 | 9/2008 | Veluchamy et al. |
| 2009/0164267 | A1 | 6/2009 | Banatwala et al. |
| 2010/0161693 | A1 | 6/2010 | Lee et al. |
| 2011/0283177 | A1 | 11/2011 | Gates et al. |
| 2012/0086971 | A1 | 4/2012 | Bisbee et al. |
| 2013/0238966 | A1 | 9/2013 | Barrus |
| 2014/0164255 | A1 | 6/2014 | Daly et al. |
| 2014/0222695 | A1 | 8/2014 | Yang et al. |
| 2014/0280463 | A1 | 9/2014 | Hunter et al. |
| 2015/0019960 | A1 | 1/2015 | Kobayashi et al. |
| 2015/0195092 | A1 | 7/2015 | Bartkiewicz et al. |
| 2015/0261732 | A1 | 9/2015 | Kim et al. |
| 2016/0020908 | A1 | 1/2016 | Kundu et al. |
| 2016/0224523 | A1 | 8/2016 | Shimkus |
| 2016/0239471 | A1 | 8/2016 | Shimkus |
| 2017/0017779 | A1 | 1/2017 | Huang et al. |
| 2021/0049320 | A1 | 2/2021 | Shimkus |
| 2021/0133253 | A1 | 5/2021 | Underwood et al. |

OTHER PUBLICATIONS

Pol Ivy, D. et al., "Authenticating Distributed Data Using Web Services and Signatures," XMLSEC '02: Proceedings of the 2002 ACM workshop on XM L security, Nov. 2002, pp. 80-89.

Prosecution History from U.S. Appl. No. 17/086,086, now issued U.S. Pat. No. 11,424,936, dated Dec. 23, 2021 through Apr. 29, 2022, 37 pp.

Datasheet: Service R-PDF Forms Automation, RPost, Captured from Internet Archive Wayback Machine Sep. 26, 2013, 2 pgs.

Datasheet: Service RSIGN TM Services: Legal E-Signatures, RPost, Captured from Internet Archive Wayback Machine Sep. 26, 2013, 2 pgs.

Datasheets-Apps, RPost, captured from Internet Archive Wayback Machine Sep. 26, 2013, available at <https://web.archive.Org/web/20130926051401/http://www.rpost.com/resources/datasheets>, 2 pgs.

Geric et al., "XML Digital Signature and its Role in Information System Security," MIPRO 2012, May 21-25, 2012, Opatija, Croatia, pp. 1520-1525.

"Making an editable PDF Form non-editable (a shortcut)," May 13, 2012, p. 1-12, retrieved from https://forums.adobe.com/thread/1004168.

Sarikava, K. et al., "A Novel Client-Based Approach for Signing and Checking Web Forms by Using XML Against DoS Attacks," iiWAS 2010: Proceedings of the 12th International Conference on Information Integration and Web-based Applications & Services, Nov. 2010, pp. 202-209.

Kutvonen et al., "From trading to eCommunity population: Responding to social and contractual challenges", Proceedings of the 10th IEEE International Enterprise Distributed Object Computing Conference, IEEE, Oct. 16, 2006, 12 pp.

Rules Settings — 402 — 400

Name of Rule: [ ]

Add Conditions — 416

406A
IF [Document ▼] [Type ▼] [Is ▼]
   [Offer Letter ▼]                *CUSTOMIZE 406B
IF [Sender ▼] [Department ▼] [Is ▼]
   [HR ▼]                          *CUSTOMIZE

— 412

+ ADD ANOTHER CONDITION
— 410

Add Actions

408A
THEN [Archive to ▼] [HR Recruiting Folder ▼]
                                   *CUSTOMIZE 408B
THEN [Send ▼] [Benefits Forms ▼]
                                   *CUSTOMIZE 408C
THEN [Send ▼] [Tax Forms ▼]
                                   *CUSTOMIZE

+ ADD ANOTHER ACTION
— 414

FIG. 4

POST-COMPLETION ACTION MANAGEMENT IN ONLINE DOCUMENT SYSTEM

CROSS REFERENCE TO RELATED APPLICATIONS

This application is a continuation of U.S. application Ser. No. 17/086,086, filed Oct. 30, 2020, now U.S. Pat. No. 11,424,936, which is incorporated by reference in its entirety.

TECHNICAL FIELD

The disclosure generally relates to an online document system, and more specifically to managing actions after requirements of an online document have been completed.

BACKGROUND

An online document system can enable supplier entities to send electronic requests to signing entities to complete requirements associated with online documents. Requirements may include signing requirements, security and authentication requirements, collection requirements, or other suitable requirements. The online document system may simplify the process of distributing the online documents and tracking progress of the requirements by managing these activities for the supplier entities.

The completion of requirements for an online document may be followed by post-completion actions. For example, the online document may be an employment offer letter, and after receiving a signed employment offer letter from a signing entity, a supplier entity may need to process the signed employment offer letter. The supplier entities may need to save the signed employment offer letter for records, follow up with the signing entity by sending benefit and tax forms, and set up accounts in external systems for employee onboarding. In current systems, after the requirements for the online documents are completed through the online document system, supplier entities typically need to perform post-completion actions manually or create custom code to automate the process. However, manually performing these post-completion actions is repetitive and time consuming and implementing an automated system is costly for supplier entities.

SUMMARY

An online document system described herein allows for the automation of post-completion actions based on rules defined by supplier entities associated with the online document system. Supplier entities may send requests including online documents to signing entities such that signing entities may complete requirements associated with the online documents. The rules define a set of conditions to be satisfied after the online document system receives completed requests from the signing entities and a set of actions to be taken if the set of conditions is satisfied. The supplier entities may define rules based on document types, which allows the supplier entities to create different processes based on the characteristics of the document types. For example, rules for processing a completed order form would differ from rules for processing a signed employment offer letter. The rules allow the supplier entities to eliminate repetitive actions for processing the same types of documents and improve efficiency of document management for the supplier entities.

In some embodiments, the online document system generates an interface to enable a supplier entity to define a set of rules for a document type. After the supplier entity sends a request including a document of the document type to a signing entity via the online document system, the online document system detects when the signing entity completes the request by providing an electronic signature in conjunction with the document. When the signed document is returned to the online document system, the online document system determines whether the set of rules for the document type has been satisfied by the signed document. For each rule of the set of rules, the online document system determines whether the corresponding set of conditions is satisfied and performs the set of actions identified by the rule if the set of conditions is satisfied.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 illustrates an example graphical user interface (GUI) of an online document system for creating rules, in accordance with an embodiment.

The figures depict various example embodiments of the present technology for purposes of illustration only. One skilled in the art will readily recognize from the following description that other alternative embodiments of the structures and methods illustrated herein may be employed without departing from principles of the technology described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Architecture

Figure 1:
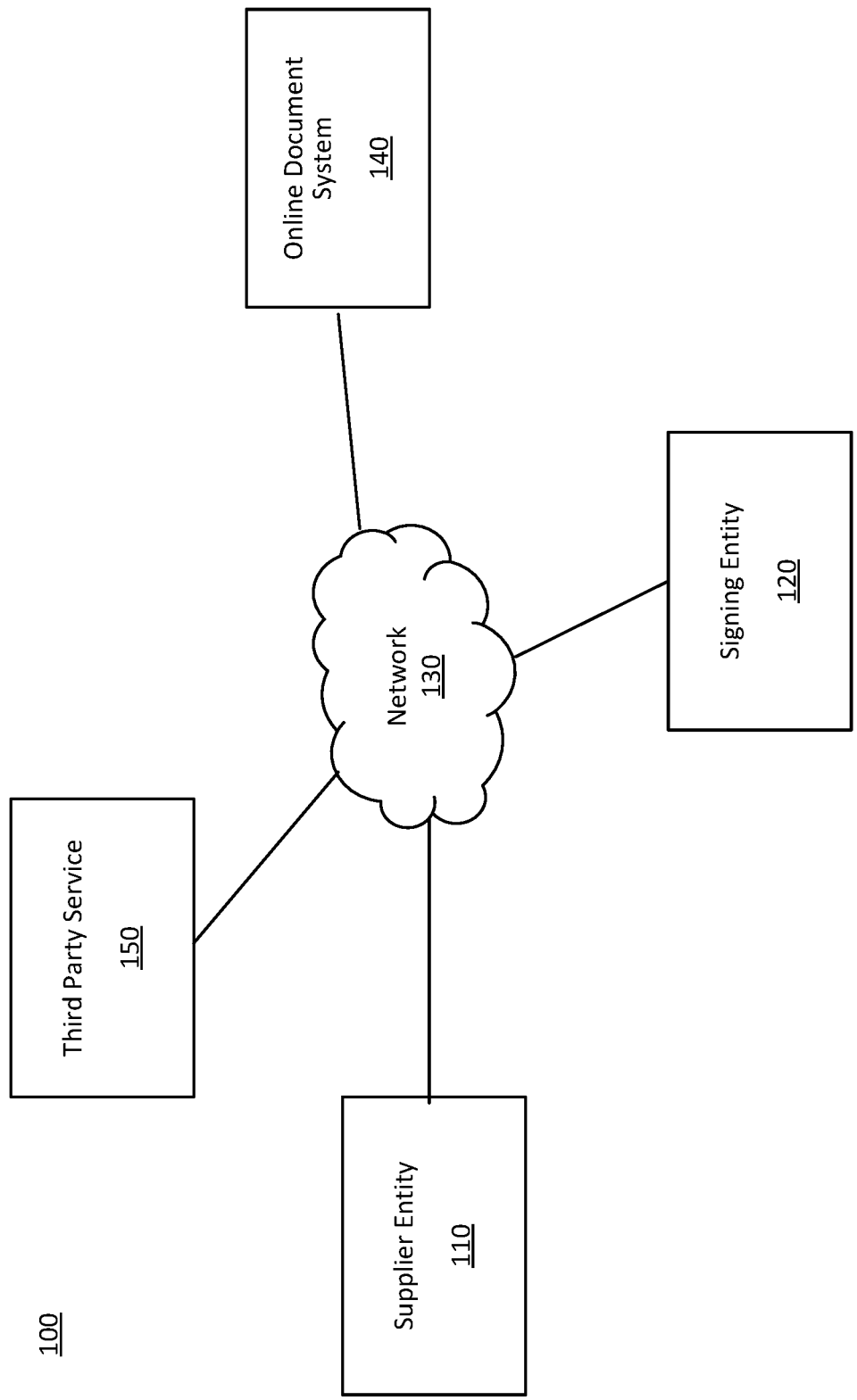
FIG. 1 is a block diagram of a system environment in which an online document system operates, in accordance with an embodiment.

FIG. 1 is a block diagram of a system environment 100 in which an online document system 140 operates, in accordance with an embodiment. The system environment 100 illustrated in FIG. 1 includes a supplier entity 110, a signing entity 120, a network 130, an online document system 140, and a third party service 150. The system environment 100 may have alternative configurations than shown in FIG. 1, including for example, different, fewer, or additional components.

The system environment 100 described herein can be implemented within an online document system, a document execution system, or any type of digital transaction management platform. It should be noted that although description may be limited in certain context to a particular environment, this is for the purposes of simplicity only, and in practice the principles described herein can apply more broadly to the context of any digital transaction management platform. Examples can include but are not limited to online signature systems, online workflow management systems, multi-party communication and interaction platforms, social networking systems, marketplace and financial transaction management systems, or any suitable digital transaction management platform.

The supplier entity 110 initiates a request associated with an online document to be completed by the signing entity 120. The supplier entity 110 may be an individual, an organization, a company, an account, and the like. The supplier entity 110 may be an administrator of the online document, which may be a person who created the online document and/or who has authority to administer the online document by changing contents of the online document, grant or deny rights to access the online document, place restrictions on, select tasks to be performed to complete the request with respect to the online document, or send the online document to one or more signing entities 120. The supplier entity 110 may use features of the online document system 140 to communicate the requests or to otherwise coordinate online document activities with the signing entities 120.

A request associated with an online document may include one or more requirements to be completed by the signing entity 120 by performing tasks such as opening the online document, reviewing contents of the online document, editing the contents of the online document, signing the online document, forwarding the online document to another user, performing identity verification, providing attachments, completing input fields of the online document, or other interactions with the online document. The tasks may be specified by the supplier entity 110 by configuring fields to be completed by the signing entity 120 within the online document. For example, the supplier entity 110 may add signature blocks, input fields for textual input, and input field for receiving attachments (e.g., images, spreadsheets, documents) in the online document to be filled in by the signing entity 120.

In some embodiments, the online document included in the request may be associated with a document type. For example, the online document may be an offer letter for a particular signing entity "John Smith" and the document type may "offer letter." The document type may be associated with one or more rules defined by the supplier entity 110 sending online documents of the document type. Each rule may identify a set of conditions and a set of actions (also referred to as "post-completion actions" herein) to be taken after a document of the document type is signed or after other requirements associated with the document type are completed. Details on rules and rule creation are described below with respect to FIG. 4.

The signing entity 120 receives a request from a supplier entity 110 to complete one or more requirements associated with an online document in the request. The signing entity 120 may be any entity that receives, reviews, executes, or performs other tasks with respect to an online document. The signing entity 120 may be an individual, an organization, a company, an account, and the like.

The supplier entity 110 and the signing entity 120 may communicate via client devices that are capable of receiving user input as well as transmitting and/or receiving data via the network 130. A client device may refer to a conventional computer system, such as a desktop or a laptop computer. Alternatively, the client device may be a device having computer functionality, such as a personal digital assistant (PDA), a mobile telephone, a smartphone, or another suitable device. The client device is configured to communicate with the online document system 140 and the third party service 150 via the network 130, for example using a native application executed by the computing device and provides functionality of the online document system 140, or through an application programming interface (API) running on a native operating system of the computing device, such as IOS® or ANDROID™. A typical client device include the hardware and software needed to input and output sound (e.g., speakers and microphone) and images, connect to the network 130 (e.g., via Wifi and/or 4G or other wireless telecommunication standards), determine the current geographic location of the client devices (e.g., a Global Positioning System (GPS) unit), and/or detect motion of the client devices (e.g., via motion sensors such as accelerometers and gyroscopes).

The online document system 140 provides access to features of the online document system 140 to supplier entities 110 and signing entities 120. For example, the secure document service 130 provides features such as creation, verification, rights management, storage, circulation, action management, and other functionalities associated with online documents. Further details of secure document service 130 are discussed below with respect to FIG. 2.

The third party service 150 is configured to provide services to the supplier entity 110. For example, the third party service 150 may be an email provider, document software provider, cloud service provider, security entities, databases, accounting or financial entities, marketing providers, messaging or communication providers, social networks, image processing or storage entities, file storage providers, credential management providers, device management entities, and the like. The third party service 150 is associated with a computing device (e.g., a server, a cloud computer) to communicate with one or more of the client device associated with the supplier entity 110 and/or the signing entity 120 and the online document system 140.

The supplier entity 110, the signing entity 120, the online document system 140, and the third party service 150 are configured to communicate via the network 130, which may comprise combination of local area and/or wide area networks, using wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

Online Document System

Figure 2:
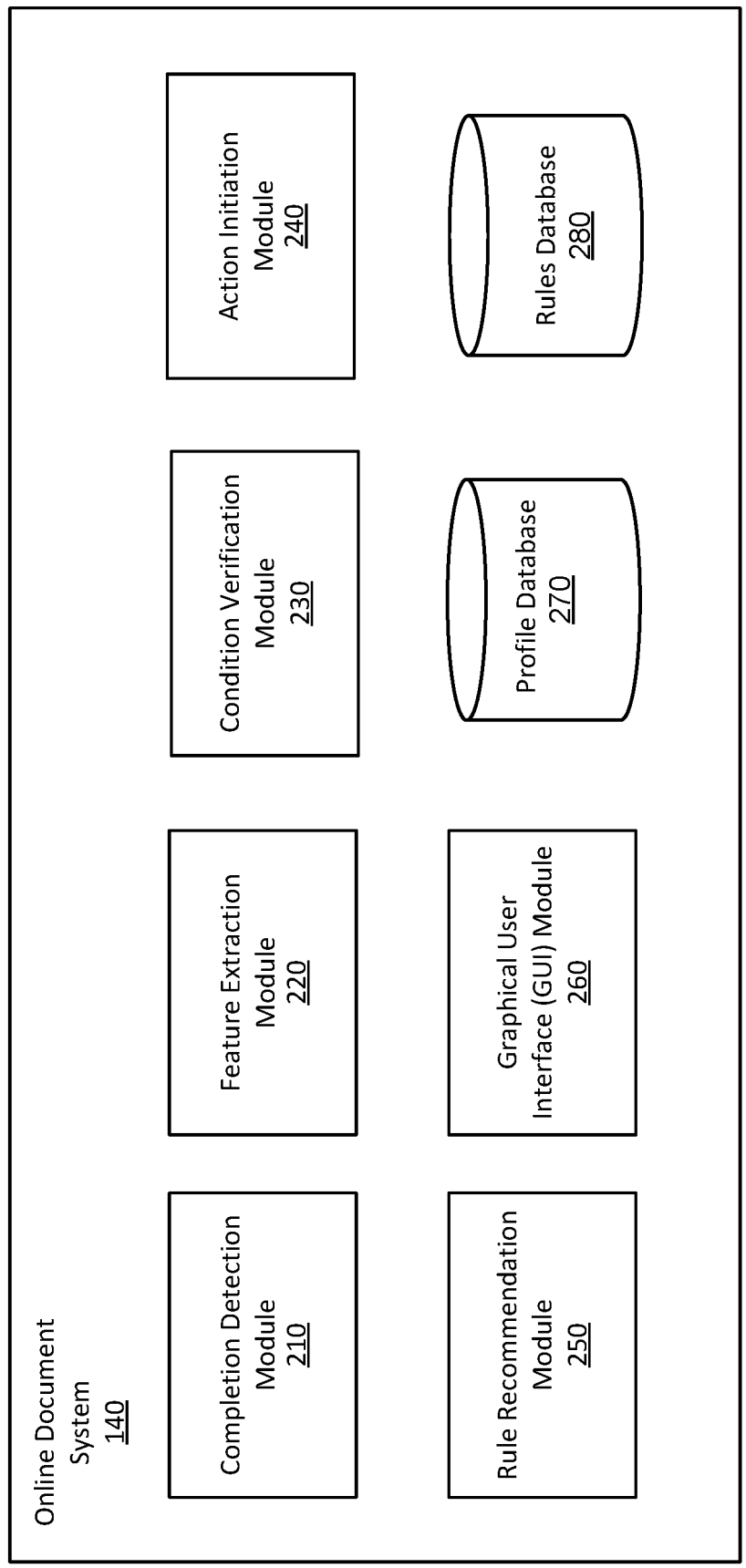
FIG. 2 is a block diagram of an online document system, in accordance with an embodiment.

FIG. 2 is a block diagram of an online document system 140, in accordance with an embodiment. The online document system 140 receives rules from a supplier entity 110, each rule identifying one or more actions to be taken after one or more conditions are satisfied. The rules allow the supplier entity 110 to customize post-completion actions to be automatically initiated by the online document system 140 by document type. The online document system 140 provides a graphical user interface (GUI) that allows the supplier entity 110 to set up the rules with simple interactions with graphical elements. After the supplier entity 110 establishes the rules, the online document system 140 detects when a request associated with an online document has been completed and automatically performs actions when conditions specified in the rules associated with a document type associated with the online document have been satisfied. The automation of post-completion actions using rules eliminates manual processes for the supplier entity 110 and improves efficiency.

The online document system 140 includes a completion detection module 210, a feature extraction module 220, a condition verification module 230, an action initiation module 240, a rule recommendation module 250, a graphical user interface module 260, a profile database 270, and a rules database 280. The modules and databases illustrated in FIG. 2 are merely exemplary, and other embodiments of the online document system 140 may include additional, fewer, and/or different components.

The completion detection module 210 detects completion of a request associated with an online document by a signing entity 120. After a supplier entity 110 transmits a request to a signing entity 120, the online document system 140 may track completion progress of requirements in the request. The request may include requirements or tasks to be completed with respect to an online document by a signing entity 120 such as opening the online document, reviewing contents of the online document, editing the contents of the online document, signing the online document, forwarding the online document to another user, performing identity verification, providing attachments, and completing input fields of the online document, or any other interaction with the online document. The tasks may be specified by the supplier entity 110 by configuring fields within the online document to be completed by the signing entity 120. For example, the requesting user may add signature blocks, input fields for textual input, and input field for receiving attachments (e.g., images, spreadsheets, documents).

The completion detection module 210 may detect when all of the requirements in the request have been completed by the signing entity 120. In some embodiments, the completion detection module 210 may determine that all of the requirements in the request have been completed when the signing entity 120 indicates that the request has been completed (e.g., press a "submit" button) or when the signing entity 120 provides an electronic signature. In some embodiments, the signing entity 120 may provide a digital signature. Responsive to detecting the completion of the request, the completion detection module 210 may generate a completion signal that is provided to the feature extraction module 220. The completion detection module 210 may store the online document of the completed request and the electronic signature as a signed document.

The feature extraction module 220 extracts features associated with a signed document. The feature extraction module 220 may receive a completion signal from the completion detection module 210 after the completion detection module 210 determines that one or more tasks in a request have been completed by a signing entity 120. Responsive to receiving the completion signal, the feature extraction module 220 extracts features or attributes associated with the signed document such document type of the online document, content of the online document (e.g., certain keywords within the document), metadata associated with the online document (e.g., creator, access privileges, date of creation, place of creation, template associated with the document), types of requirements requested by the supplier entity 110, and input provided by the signing entity 120.

In some embodiments, the feature extraction module 210 may extract features associated with the supplier entity 110 and/or the signing entity 120. The features may include user characteristics stored in the profile database 270, previous activity within the online document system 140, and other information associated with the supplier entity 110 and/or the signing entity 120. The profile database 270 includes profile data of users (e.g., supplier entity 110, signing entity 120) of the online document system 140. The profile data may include data input by the users (e.g., demographic and biographical information), data associated with users that was not input by the users (e.g., attributes determined by the online document system 140), and activity history of the users such as previous requests sent or received by the user. Additional features can include a time of signing, identities of additional signing entities, a type of signature, types or values of other information provided by the signing entity 120, and the like.

The condition verification module 230 verifies whether conditions of rules have been satisfied by the signed document. The condition verification module 230 receives the extracted features associated with the signed document from the feature extraction module 220 and compares the features to the conditions defined in the rules provided by a supplier entity 110. The condition verification module 230 accesses the rules stored in the rules database 280 and determines whether the signed document is subject to one or more rules defined by the supplier entity 110. The rules database 280 receives and stores rules specified by supplier entities 110 of the online document system 140.

In some embodiments, the condition verification module 230 may identify a document type associated with the signed document and retrieve one or more rules associated with the document type. For example, if the online document is an offer letter, the condition verification module 230 may identify a first set of rules associated with the offer letter document type, and if the online document is a sales order, the condition verification module 230 may access a second set of rules different from the first set associated with the sales order document type. After identifying the rules corresponding to the document type of the completed online document, the condition verification compares the extracted features of signed document to the conditions described in the rules.

In some embodiments, conditions may be associated with metadata. Examples of metadata associated with a completed request include creator of online document, access privileges, date of creation of online document, file size, date of request transmission, date of request completion, place of creation, template associated with the secure document, tags and categories, file name, and any other aspect of the online document, signing entity, or the request.

In some embodiments, conditions may be associated with a user-provided response to input fields in the online document. Input field may be a text entry, a radio button, a checkbox. For example, an input field in the online document may be associated with a question, and based on the response of the signing entity 120, a different rule may be applied to the request. If the signing entity 120 responds "yes" to the question, the response may satisfy a condition of a first rule that is associated with a first set of actions, and if the signing entity 120 responds "no" to the question, the response may satisfy a condition of a second rule that is associated with a second set of actions.

The action initiation module 240 identifies actions to be taken based on rules with satisfied conditions and initiates the identified actions. Actions may be internal actions within the online document system 140 or external actions to be performed by a third party service 150. Following the completion of a request, the condition verification module 230 identifies one or more rules with conditions that have been satisfied. The condition verification module 230 provides the identities of the rules with satisfied conditions to the action initiation module 240. The action initiation module 240 generates instructions to be provided to other modules within the online document system 140 to perform the actions specified in the rules or generates instructions to be provided to third party service 150 for performing the actions.

In some embodiments, an action associated with a rule includes accessing another online document stored in the online document system 140 and providing the other online document in another request to be completed by the signing entity. For example, a supplier entity 110 may be an employer and a signing entity 120 may be a new employee. The supplier entity 110 may send a first request including an employment offer letter to be signed by the signing entity 120. When the signing entity 120 signs the offer letter and returns the signed offer letter to the supplier entity 110, the action initiation module 240 may refer to rules associated with offer letter document type. One of the rules may specify that if a signature field in an offer letter document has been completed, the online document system 140 should automatically send additional forms (e.g., benefits forms, tax forms) to be completed.

In some embodiments, an action associated with a rule includes saving a signed document to file storage. The rule may specify destination folders for the signed document to be saved in. The file storage may be maintained by the online document system 140 or by a third party service 150. Continuing with the offer letter example, the rule may specify that a signed offer letter be stored in a particular folder with a file name including the first and last name of the signing entity 120.

In some embodiments, an action associated with a rule includes exporting input provided by a signing entity to a third party service 150. The supplier entity 110 may use a plurality of different services, and rules may allow the supplier entity 110 to perform post-completion actions automatically across different third party services. For example, a signing entity 120 may provide biographical information in a new employee package along with a signed employment offer letter. Responsive to determining that the employment offer letter has been signed, the action initiation module 240 may extract on or more inputs to input fields and provide the inputs to third party systems 130. For example, a third party system 130 may be a human resources management system, and the action initiation module 240 may automatically export the biographical information and instruct the third party system 130 to create a new account associated with the new employee based on the exported biographical information.

In some embodiments, an action associated with a rule includes initiating a predefined workflow. A workflow includes a sequence of activities involving a signed document. For example, after receiving a signed employment offer letter, the action initiation module 240 may initiate a workflow including the ordered steps of starting a background check on a new employee, sending the background check results to a manager for review, receiving signature from the manager, and updating the human resources system with the background check results.

The rule recommendation module 250 recommends rules to a supplier entity 110 to improve efficiency of actions performed on the online document system 140. The rule recommendation module 250 may be implemented using a variety of types of machine-learned models or trainable networks. For example, the one or more machine learning models may be a neural network, decision tree, or other type of computer model, and any combination thereof. The machine-learned models may be trained using a training set of rules from the rules database 280. The machine-learned models may learn links between conditions and actions based on existing rules in the online document system 140 and suggest one or more rules that may improve the user experience for supplier entity 110. The rule recommendation module 250 may receive extracted features from the feature extraction module 220, previous actions performed by the supplier entity 110, or previous actions performed by other entities on the online document system 140 and recommend one or more rules to the supplier entity 110 based on the conditions of the completed request. For example, the rule recommendation module 250 may identify a pattern in activity performed by the supplier entity 110 saving documents of a particular document type is a same destination folder and sending another set of documents.

The rule recommendation module 250 may present the recommended rule to a supplier entity 110 by specifying a recommended condition and a recommended action. If the rule recommendation module 250 receives instructions from the supplier entity 110 to implement the recommended rule for future requests sent by the supplier entity 110, the rule recommendation module 250 may generate the rule and store the rule in the rules database 280. In some embodiments, the rule recommendation module 250 may receive modifications from the supplier entity 110 responsive to presenting the recommended rule and store the modified rule.

The graphical user interface (GUI) module 260 generates a GUI that is presented to a supplier entity 110 for generating requests, creating rules, receiving rule recommendations, and other otherwise interacting with features of the online document system 140. An example GUI for setting rules is described with respect to FIG. 4.

Example Flow of Post-Completion Action

Figure 3:
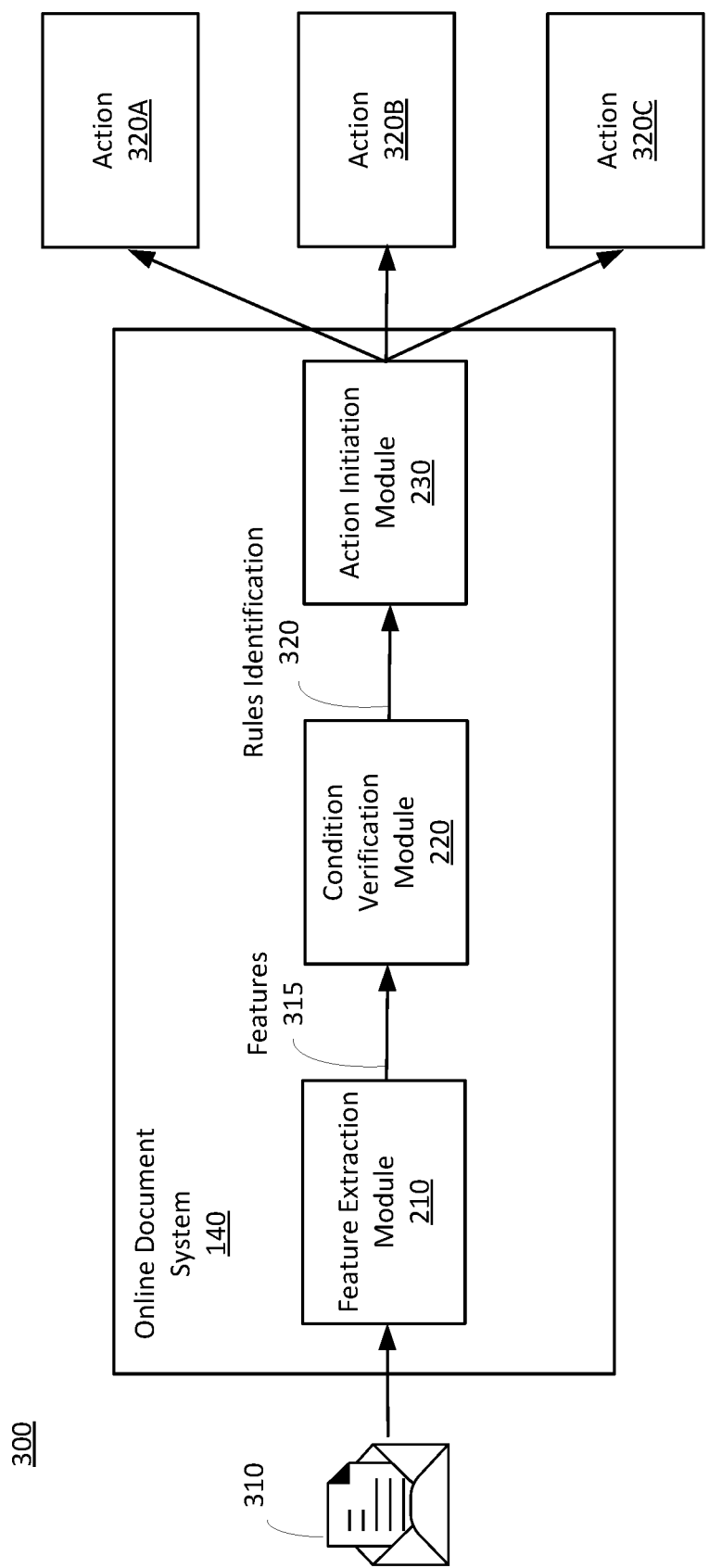
FIG. 3 illustrates a process of initiating actions after an online document is signed, in accordance with an embodiment.

FIG. 3 illustrates a process of initiating actions after an online document is signed, in accordance with an embodiment. When a request 310 sent to a signing entity 120 by a supplier entity 110 is completed by the signing entity 120, the online document system 140 detects the completion. The signed document of the completed request 310 is provided to the online document system 140, and the online document system 140 extracts features 315 associated with the signed document using the feature extraction module 210. The extracted features 315 are provided to the condition verification module 220 that compares the extracted features to conditions of rules specified by the supplier entity 110 that sent the request 310. Responsive to determining that conditions of one or more rules have been satisfied by the completed request 310, the condition verification module 220 provides rules identification 320 of the one or more rules with satisfied conditions. The action initiation module 230 receives the rules identification 320 and sends instructions to appropriate modules of the online document system 140 or third party services 150 to perform actions 320A, 320B, 320C.

Example Graphical User Interface

FIG. 4 illustrates an example graphical user interface (GUI) 400 of an online document system for creating rules, in accordance with an embodiment. The GUI 400 may be presented to a supplier entity 110 such that the supplier entity 110 may create rules by specifying a set of conditions and set of actions to be taken if the set of conditions is satisfied. In alternative configurations, different and/or additional components may be included in the GUI 400.

The GUI 400 includes a name input field 402, condition selection fields 406, and action selection fields 408. The supplier entity 110 may provide a unique name for a rule by providing a textual input to the name input field 402. The supplier entity 110 may specify conditions to be checked by the online document system 140 after receiving a signed document using the condition selection fields 406. As illustrated in FIG. 4, the condition selection fields 406 may include a plurality of graphical elements 416 that allow the supplier entity 110 to provide details associated with the conditions. The graphical elements 416 may be dropdown menus that present one or more possible options that may be selected by the supplier entity 110. In other embodiments, the graphical elements 416 may be text entry fields, checkboxes, radio buttons, or other input elements.

In some embodiments, the one or more possible options included in the dropdown menus may include predetermined conditions generated by the online document system 140 based on historical documents managed by the online document system 140. The predetermined conditions may be generated based on rules previously defined by the supplier entity 110 or based on patterns in rules defined by among other users of the online document system 140 in association with the historical documents. For example, the predetermined conditions may include recommendations generated by the rule recommendation module 250. Additionally, the GUI 400 may include a customize icon 412 that allows the supplier entity 110 to customize one or more of the graphical elements when a desired option is not available in the dropdown menu. Responsive to interacting with the customize icon 412, the GUI 400 may present additional options that the supplier entity 110 may search through and add to the dropdown menu. The supplier entity 110 may also add additional graphical elements to the condition selection fields 406 for defining the conditions.

As shown in the GUI 400, a first condition selection field 406A may specify a document type that the rule is associated with. The first condition selection field 406A indicates that a first condition for the rule is for the signed document to be associated with a document type of "Offer Letter." Thus, when a signed document has a document type of "Offer Letter," the online document system 140 may determine that the signed document satisfies the first condition. A second condition selection field 406B may specify an entity associated with a rule. The second condition selection field 406B indicate that a second condition for the rule is for the signed document to have been sent by a sender that is in the HR department. When the online document system 140 receives a signed document, the online document system 140 may compare metadata associated with the signed document to determine who initiated the request including the signed document. For example, the online document system 140 may determine an email address of the sender and compare the email address to a known set of email addresses that are included in the HR department.

In the example illustrated in the GUI 400, only two condition selection fields 406 are shown. However, the GUI 400 may include an add another condition icon 410 to allow the supplier entity 110 to define additional conditions associated with the rule.

Similar to the condition selection fields 406, the action selection fields 408 may include a plurality of graphical elements 416 that allow the supplier entity 110 to provide details associated with the actions to be taken by the online document system 140 after the conditions of the rule are satisfied. Responsive to a graphical element 416 being selected, the GUI 400 may present options including predetermined actions generated by the online document system 140 based on historical documents, rules previously defined by the supplier entity 110, or patterns in rules defined by other users of the online document system 140. The predetermined actions may include recommendations generated by the rule recommendation module 250.

As shown in the GUI 400, a first action selection field 408A may specify a first action of archiving the signed document in the "HR Recruiting Folder", a second action selection field 408B may specify a second action of sending the signing entity 120 "Benefits Forms", and a third action selection field 408C may specify a third action of sending the signing entity 120 "Tax Forms." The supplier entity 110 may further customize the action selection fields 408. For example, the supplier entity 110 may add another graphical element 416 to the first action selection field 408A to instruct the online document system 140 to additionally save a copy of the signed document to an additional folder.

Computing Machine Architecture

Figure 5:
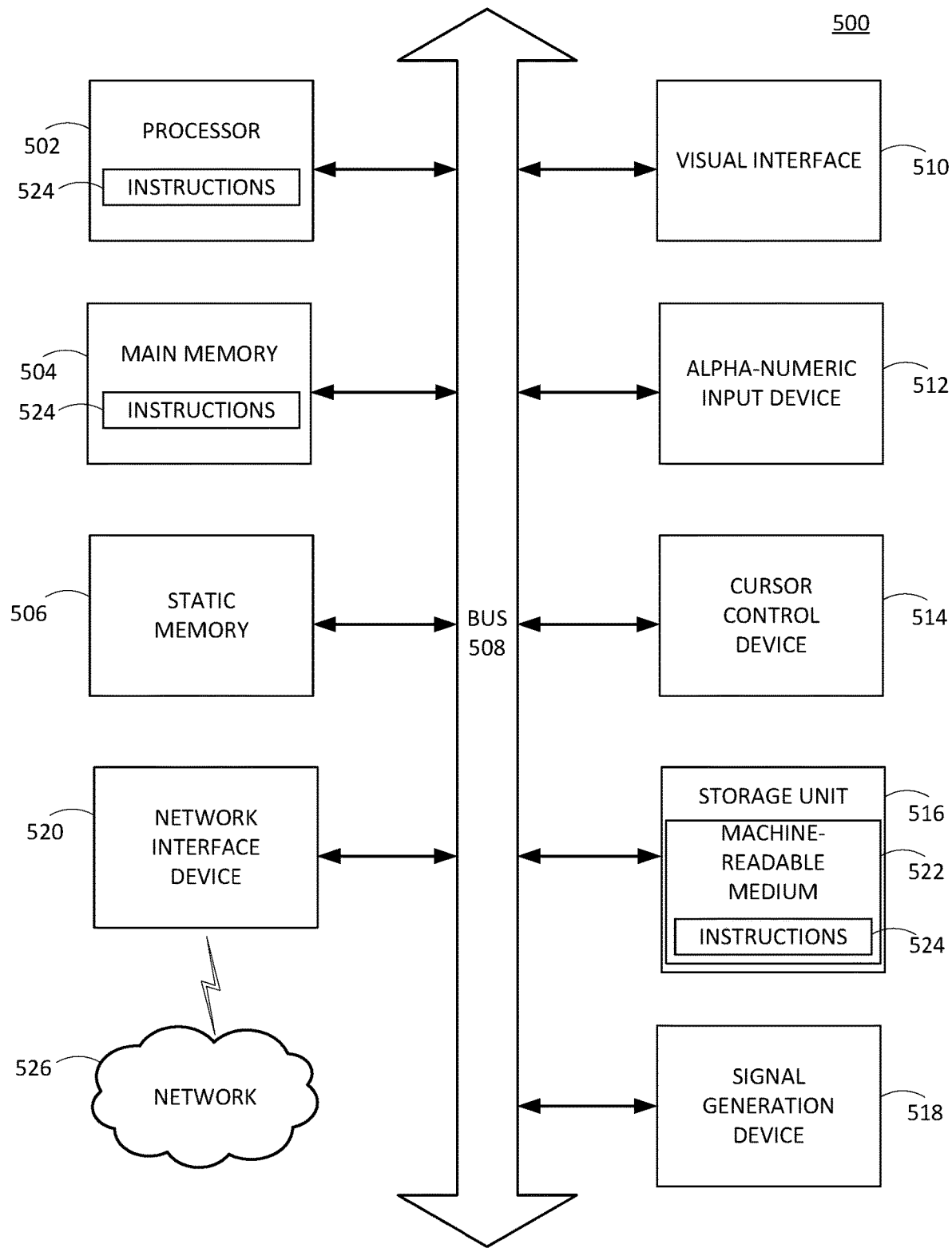
FIG. 5 is a block diagram illustrating a computer system 500 for use in managing actions, in accordance with an embodiment.

FIG. 5 is a block diagram illustrating a computer system 500 for use in managing actions, in accordance with an embodiment. The computer system 500 is able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein. Any client device or service disclosed herein may use some or all functionality described with respect to the machine.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Process of Managing Actions

Figure 6:
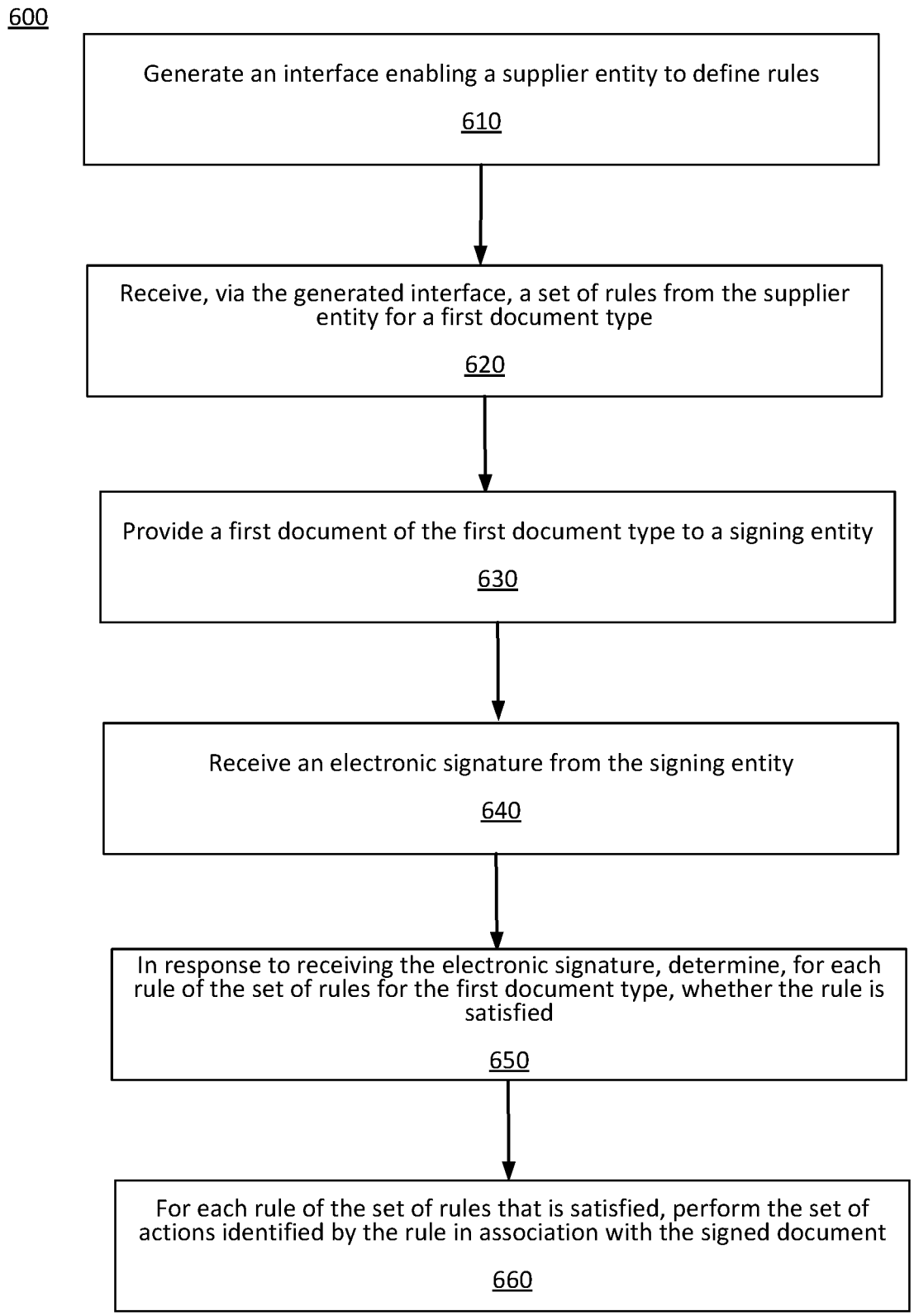
FIG. 6 is a flowchart illustrating a process for managing actions after an online document is signed, in accordance with an embodiment.

FIG. 6 is a flowchart illustrating a process 600 for managing actions after an online document is signed, in accordance with an embodiment. In some embodiments, the online document system 140 performs operations of the process 600 in parallel or in different orders, or may perform different steps.

The online document system 140 generates 610 an interface enabling a supplier entity 110 to define rules. Each rule may be associated with a document type and identify a set of conditions and a set of actions to be taken after a document of the document type is signed if the set of conditions is satisfied. The online document system 140 receives 620 a set of rules from the supplier entity 110 for a first document type via the generated interface. The online document system 140 provides 630 a first document of the first document type to a signing entity 120. After providing the first document, the online document system 140 receives 640 an electronic signature from the signing entity 120. The electronic signature and the first document may be stored as a signed document. In response to receiving the electronic signature, the online document system 140 determines 620 whether a rule is satisfied for each rule of the set of rules for the first document type. For each rule of the set of rules that is satisfied, the online document system 140 performs 660 the set of actions identified by the rule in association with the signed document.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computer system $500s$ referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   generating an interface comprising a recommendation that a rule be defined for a document of a document type based on the document type and prior activity of a supplier entity with respect to the document type;
   receiving, via the generated interface, a selection of the rule from the supplier entity for the document type;
   providing a first document of the document type to a signing entity;
   receiving an electronic signature from the signing entity, the received electronic signature and the first document stored as a signed document;
   in response to receiving the electronic signature, determining that the rule is satisfied by the signed document; and
   performing a set of actions identified by the rule in association with the signed document.

2. The method of claim 1, further comprising:
   receiving, for the rule, an interaction with a first graphical element displayed on the interface, the interaction indicating a set of conditions associated with the rule; and
   receiving, for the rule, an interaction with a second graphical element displayed on the interface, the interaction indicating the set of actions that are to be performed automatically responsive to determining that the set of conditions are satisfied.

3. The method of claim 2, wherein one or more conditions of the set of conditions are based on inputs to one or more data fields of the document type.

4. The method of claim 2, wherein one or more conditions of the set of conditions are based on metadata associated with the document type.

5. The method of claim 2, wherein the set of conditions and the set of actions are selected from a plurality of predetermined conditions and a plurality of predetermined actions generated by an online document entity based on historical documents.

6. The method of claim 2, wherein determining that the rule is satisfied by the signed document comprises determining that the set of conditions are satisfied.

7. The method of claim 1, wherein performing the set of actions comprises:
   extracting data provided by the signing entity from one or more data fields in the document; and
   exporting the data to a third party system.

8. A non-transitory computer-readable medium comprising memory with instructions encoded thereon, the instructions, when executed, causing one or more processors to perform operations, the instructions comprising instructions to:
   generate an interface comprising a recommendation that a rule be defined for a document of a document type based on the document type and prior activity of a supplier entity with respect to the document type;
   receive, via the generated interface, a selection of the rule from the supplier entity for the document type;
   provide a first document of the document type to a signing entity;
   receive an electronic signature from the signing entity, the received electronic signature and the first document stored as a signed document;
   in response to receiving the electronic signature, determine that the rule is satisfied by the signed document; and
   perform a set of actions identified by the rule in association with the signed document.

9. The non-transitory computer readable medium of claim 8, the instructions further comprising instructions to:
   receive, for the rule, an interaction with a first graphical element displayed on the interface, the interaction indicating a set of conditions associated with the rule; and
   receive, for the rule, an interaction with a second graphical element displayed on the interface, the interaction indicating the set of actions that are to be performed automatically responsive to determining that the set of conditions are satisfied.

10. The non-transitory computer readable medium of claim 9, wherein one or more conditions of the set of conditions are based on inputs to one or more data fields of the document type.

11. The non-transitory computer readable medium of claim 9, wherein one or more conditions of the set of conditions are based on metadata associated with the document type.

12. The non-transitory computer readable medium of claim 9, wherein the set of conditions and the set of actions are selected from a plurality of predetermined conditions and a plurality of predetermined actions generated by an online document entity based on historical documents.

13. The non-transitory computer readable medium of claim 9, wherein the instructions to determine that the rule is satisfied by the signed document comprise instructions to determine that the set of conditions are satisfied.

14. The non-transitory computer readable medium of claim 8, wherein the instructions to perform the set of actions comprise instructions to:
   extract data provided by the signing entity from one or more data fields in the document; and
   export the data to a third party system.

15. A method comprising:
   generating a recommendation that a rule be defined for a document of a document type based on the document type and prior activity of a supplier entity with respect to the document type;
   providing a first document of the document type to a signing entity;
   receiving an electronic signature from the signing entity, the received electronic signature and the first document stored as a signed document;

in response to receiving the electronic signature, determining that the rule is satisfied by the signed document; and performing a set of actions identified by the rule in association with the signed document.

16. The method of claim 15, wherein the recommendation is displayed on an interface.

17. The method of claim 16, further comprising receiving a selection of the rule in association with the document type by way of the interface.

18. The method of claim 15, wherein the rule identifies a set of conditions.

19. The method of claim 18, wherein determining that the rule is satisfied by the signed document comprises determining that each of the set of conditions is satisfied.

20. The method of claim 15, wherein performing the set of actions occurs responsive to determining that the rule is satisfied.

* * * * *